Figure 1:
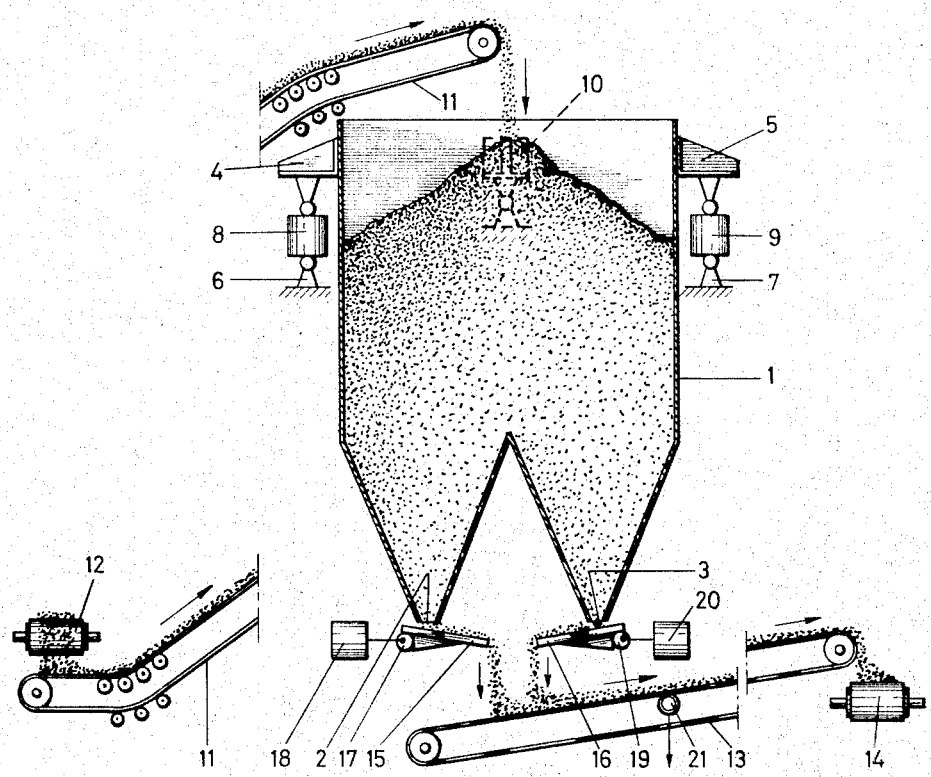

United States Patent [19]
Burger et al.

[11] 3,782,528
[45] Jan. 1, 1974

[54] METHOD AND A DEVICE FOR MIXING AND HOMOGENIZING OF BULK MATERIAL

[75] Inventors: Jacobus J. Burger, Driehuis; Gerrit De Jong, Velsen; Gradus J. J. Den Boer, Driehuis, all of Netherlands

[73] Assignee: Koninklijke Nederlandsche Hoogovens En Staalfabrieken N. V., Ijmuiden, Netherlands

[22] Filed: Sept. 10, 1971

[21] Appl. No.: 179,499

[30] Foreign Application Priority Data
Sept. 10, 1970  Netherlands ..................... 7013571

[52] U.S. Cl. ................... 198/36, 198/39, 198/44, 214/2, 214/10, 214/17 CA, 214/152
[51] Int. Cl. ............................................. B65g 57/02
[58] Field of Search ................. 214/10, 17 CA, 152, 214/2; 198/36, 39

[56] References Cited
UNITED STATES PATENTS

| | | | |
|---|---|---|---|
| 3,606,954 | 9/1971 | Mayer | 214/10 |
| 2,737,997 | 3/1956 | Himmelherer et al. | 214/17 CA X |
| 3,165,195 | 1/1965 | Sass et al. | 198/39 X |
| 3,358,855 | 12/1967 | Carlton et al. | 214/10 |
| 3,470,635 | 10/1969 | Langner et al. | 198/36 X |
| 3,682,339 | 8/1972 | Knappstein | 222/58 X |

FOREIGN PATENTS OR APPLICATIONS
1,150,604  4/1969  Great Britain ....................... 214/10

*Primary Examiner*—Gerald M. Forlenza
*Assistant Examiner*—Frank E. Werner
*Attorney*—J. Y. Houghton

[57] ABSTRACT

In a method and means for mixing and homogenizing bulk material such as lump ore and ore concentrates, in which a mixing heap is formed by dumping the material as a large number of layers one on top of the other, said mixing heap thereupon being dug off over the entire height, in which for forming said mixing heap the material to be dumped in layers is fed by a digging machine onto a belt conveyor system and is dumped from this system by a longitudinally moving dumping machine onto the said mixing heap, the material during transport to the dumping machine passes through a throughflow hopper, from which it is discharged in a constant flow, and the speed of the digging machine is controlled in dependency upon the filling of this hopper by special mechanisms, preferably comprising a metering device below the hopper, weight signalling means, weight-to-volume converting means, and special supports and controls.

6 Claims, 3 Drawing Figures

INVENTORS
JACOBUS J. BURGER,
GERRIT DE JONG,
GRADUS J.J. DEN BOER.

BY Hall & Houghton
ATTORNEY

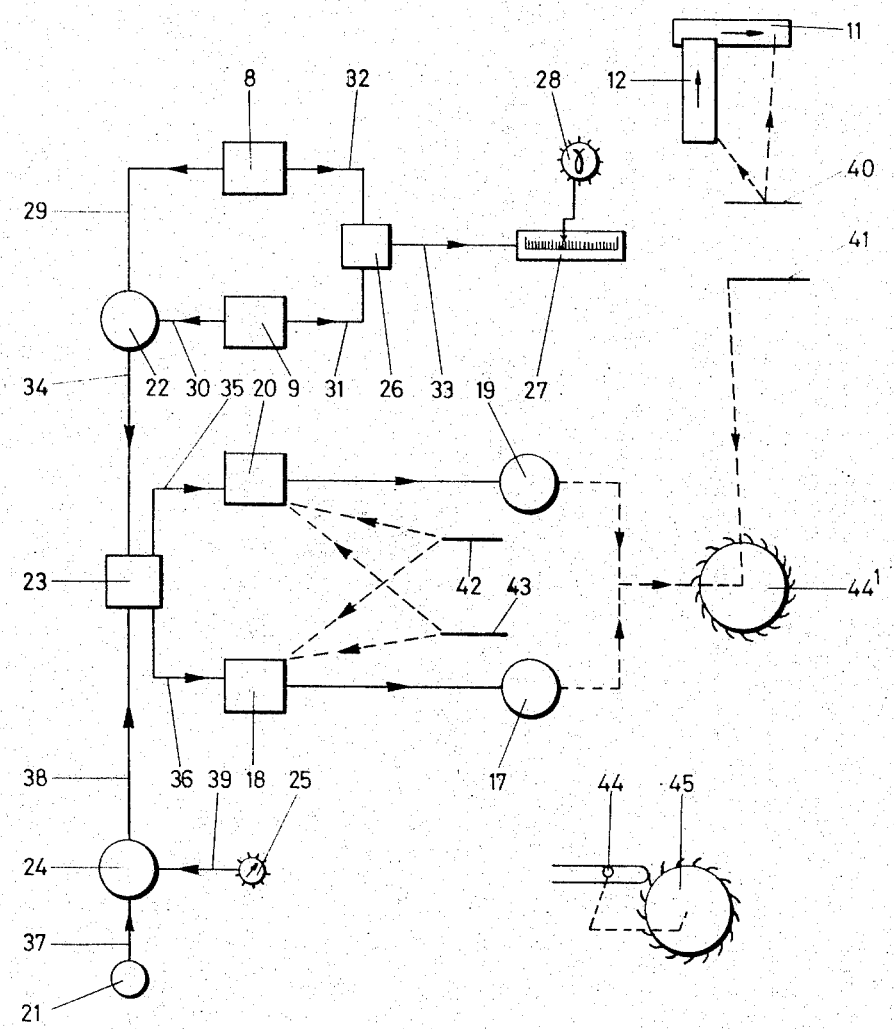

METHOD AND A DEVICE FOR MIXING AND HOMOGENIZING OF BULK MATERIAL

This invention relates to a method and a device for mixing and homogenizing bulk material such as lump ore and ore concentrates, in which a mixing heap is formed by dumping said material as a large number of layers one on top of the other, said mixing heap thereupon being dug off over its entire height, in which for forming said mixing heap the material to be dumped in layers is fed by a digging machine onto a belt conveyor system and is dumped from this system by a longitudinally moving dumping machine onto the said mixing heap.

When operating modern blast furnaces of high capacity it has appeared that the course of the process in the blast furnace and the quantity and quality of the product from the blast furnace can be influenced considerably in a favourable direction by a very selective choice of the charge of the blast furnace. Among other things it is in this respect of importance that the chemical composition of the ore supplied over an extended period is as uniform as possible. However, it has moreover appeared that an optimum charging in many cases is only possible by mixing ores derived from different deposits.

In order to be able to charge a blast furnace during an extended period with a flow of ore which is mixed from a number of components and which moreover is very homogeneous in composition it has previously been proposed to use so-called mixing beds or fields, in which a mixing heap is composed in a manner as given above and thereupon is dug off. Such mixing heaps may have a length of e.g. 300 m and a width of e.g. 30 m.

It is usual to build up such a mixing heap from several hundreds of layers with the aid of a dumping machine which moves at a speed of several tenths of meters per minute along the mixing heap.

Although this known method produces a very much better homogeneity of the ore mass, the invention aims at further improving said homogeneity.

In this respect it has appeared that notwithstanding the very large quantity of layers from which the mixing heap is composed, measurable and more than negligible differences in composition occur in product derived from said mixing heap, which cause differences, deviations and instability in the blast furnace process. Such effects can be decreased further by trying to give all the dumped layers a thickness which is as uniform as possible. In this case, however, there are considerable difficulties because it is difficult to achieve an ore flow to the mixing heap which is accurately constant.

According to the invention a solution of the problem was found in that the material during transport to the dumping machine passes through a through-flow hopper, from which it is discharged in a constant flow, and in that the speed of the digging machine is controlled in dependency upon degree of filling of this hopper.

The present invention not only relates to this method, but also to a device for the forming of uniformly built up mixing heaps of e.g. layers of several different ores, comprising a digging machine, a dumping machine which is longitudinally displaceable, and a belt conveyor system to convey material from the digging machine to the dumping machine, said device being characterized in that the belt conveyor system includes a through-flow hopper for the throughflow of the material, below which a metering device is positioned, and that means are present to detect the degree of filling of the hopper so that the speed of the digging machine can be controlled in dependence thereon. The digging machine may be automatically controlled in dependence on the degree of filling.

It is remarked, that, although the invention is and will be described with reference to the application thereof for mixing ore, comparable applications are possible for homogenizing and mixing several other kinds of bulk material such as sand, coals etc.

When building up a mixing heap from e.g. 400 layers it might be expected that variations in thickness within each of said layers will only very slightly influence the average composition of the mixing heap as measured over the height thereof. Thus it is not very obvious to ascribe disturbances and differences in uniformity in the process in the blast furnace to variations in the thickness of each individual dumped layer in the mixing heap.

It has, however, surprizingly appeared that when applying the invention the process in the blast furnace can be improved considerably in that it is a result of the invention that each formed layer has a more constant thickness.

The throughflow hopper serves as a buffer between the variable supply of the ore and the constant discharge thereof. With the aid of a signal indicating the amount of filling of that hopper it is possible to control the speed of the digging machine both by hand and automatically. In the first case the measured signal should be transferred to the digging machine operator, who therefrom derives an indication about how to adapt the speed of his digging machine. The required signal may be obtained by photo-optical means. Also means are known to measure the amount of filling of a hopper with the aid of gamma-ray devices and similar means. It has appeared that such methods are difficult to apply in the prevailing circumstances and that they moreover do not give a very reliable signal. Thus it is preferred that the throughflow hopper is supported by weighing means giving an electric weighing signal, that moreover means are present for translating the weighing signal into a volume signal in dependency on the measured specific bulk weight of the material, and that this corrected signal is fed to the digging machine for controlling the speed thereof. The measuring of the amount of filling of the hopper has thus become independent of the shape of the cone of the material which is caused by the dumping thereof into the hopper and moreover this measurement is independent of the flow of ore which continuously falls on top of said cone. The correction for the specific bulk weight of the material is necessary as for different types of ore the specific gravity may vary from 1.8 to 3.2 tons per $m^3$. It is possible to apply such a correction in such a way that each time when digging off another type of ore the specific bulk weight is determined and the electric weighing signal measured at the hopper is corrected with the aid of said measured bulk weight. It is also possible to determine the bulk weight continuously or intermittently in an automatic manner and to have the result thereof correct the measurement of the amount of filling of the hopper.

The dimensions of the throughflow hopper are subject to conflicting requirements. On the one hand this hopper should be as low as possible in order to limit the dimensions and total cost of the conveyor system with inclined conveyor belts, as said belts are limited to a maximum angle of inclination.

On the other hand the maximum amount of ore which should be stored is very large as a result of the long time of passage of the ore through the conveyor system from the digging machine to the hopper. E.g. with a total throughflow time of 8 minutes and a metering capacity of the digging machine of 2,000 tons per hour the hopper will have to be able to buffer up to about 150 m³ of ore. However, if the hopper is made very low and thus will have to have considerable horizontal dimensions the danger exists that it will be filled asymmetrically to a large extent and thus will discharge non-uniformly and not smoothly to the metering device. The solution of filling the hopper uniformly with the aid of a movable intermediary conveyor belt above the point of discharge into the hopper is not suitable as it is complicated and expensive.

In order to meet with these objections an embodiment of the invention is preferred in which the throughflow hopper has two discharge orifices, each connected to a metering apparatus of the metering device, said metering apparatuses being both connected to a single conveyor belt, in which moreover the throughflow hopper is supported in three supports, one being a universal joint or pivot, e.g. with spherical faces to allow pivoting in all vertical directions, the other two supports being provided with load measuring devices and in which a control device is present to control the relation of the discharge speeds of the two metering apparatuses in dependence on the ratio of the signals transmitted by the load measuring devices.

As the discharge from the hopper is distributed over two orifices, it is possible to make the hopper considerably lower and wider. If the filling of the hopper has a tendency to build up eccentrically, this is automatically corrected because at the highest side of the ore heap in the hopper the metering apparatus below it will discharge a larger quantity per unit time and the other metering apparatus will discharge less ore. It will be clear that, in order to obtain this, it is preferred that the two systems, each comprising a discharge opening of the hopper and a load measuring device, are symmetrical with respect to each other and that the universal pivot is positioned in the plane of symmetry of these two systems. Thus it is possible for the two load measuring devices to transmit signals which are immediately comparable and which are able to act upon the metering apparatus related thereto without intricate measures to give the desired results.

Apart from the fact that the two metering apparatuses should be controllable so that the ratio of their discharge quantities per unit time can be controlled in dependence upon the filling pattern in the hopper, it is also desired that the total discharge capacity of these metering apparatus may be varied. In particular it is desired that in the conveyor belt system between the throughflow hopper and the dumping machine there is a conveyor belt weighing apparatus, coupled through an adjustable quantity control device to the drive of the metering device, so that the total quantity metered per unit time may be controlled to be maintained at an adjustable level. It will be clear that the signal of the conveyor belt weighing apparatus should be corrected for the measured specific bulk weight of the passing ore.

Several types of metering apparatus are known for discharging material from hoppers, such as screw conveyors, cell wheels and vibrating or pulsating troughs. It has appeared that the best results may be obtained if use is made of mechanically driven pulsating troughs. In this case there is no danger of clogging, jamming or fouling of the driving mechanism. As compared with electromagnetically driven pulsating troughs mechanically driven troughs moreover have the advantage that they are not or only very little dependent upon the specific bulk weight of the ore. When applying an electromagnetic drive of the pulsating troughs it would on the contrary be necessary to correct the thickness of the layer of the ore in the trough depending upon the specific bulk weight of the material.

In normal operation of the device described above the control system will be able to adapt the digging speed of the digging machine to the capacity of the dumping machine in such a way that the pouring cone of the bulk material is positioned substantially halfway up the height of the hopper. As a result of particular conditions or circumstances at the digging machine and/or the dumping machine situations are nevertheless possible in which the hopper would run the risk of becoming entirely filled or entirely emptied. In the first case this would of course mean that a quantity of ore would fall outside the hopper and in the last case the metering apparatus would be unprotected against idling and against damage by ore falling immediately thereon from a large height.

Thus an embodiment of the device according to the invention is preferred in which the means for controlling the speed of the digging machine are also adapted to stop the conveyor belts for the supply to or the discharge from the throughflow hopper when the filling amount of the hopper is higher than an upper critical level or is lower than a lower critical level respectively.

When starting the plant or after the amount of filling of the hopper has reached a lower critical level, the belt extending to the head of the dumping machine will no more carry over its entire length a constant weight of ore. Now if the plant will start operating the dumping machine would during a certain time period dump a layer of unequal thickness onto the mixing heap during movement of said machine, which is of course undesirable. It has appeared that it is possible to avoid this objection if according to the invention at a short distance before the dumping machine a conveyor belt weighing device is provided, coupled to the driving system for this dumping machine.

The invention will now be explained with reference to the enclosed drawings giving by way of example a possible embodiment of the device according to the invention.

FIG. 1 gives somewhat diagrammatically a front view and a vertical section through part of the device.

Figure 2:
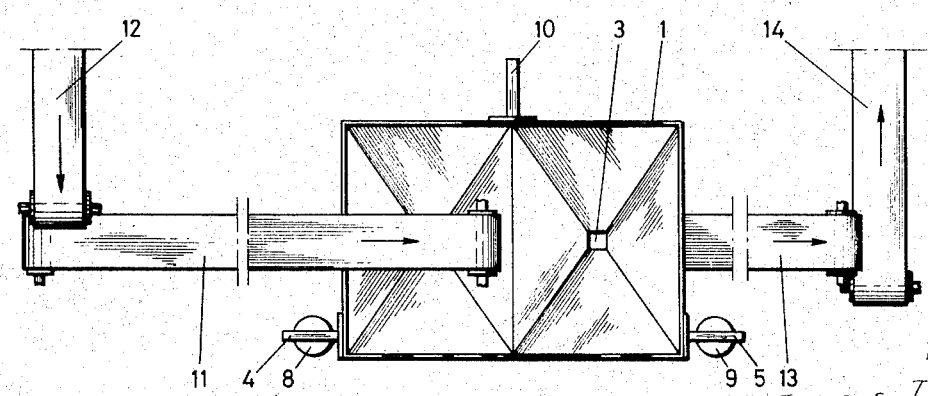

FIG. 2 shows a view from above of the device according to FIG. 1.

FIG. 3 gives a flow sheet and block diagram of the several control circuits of this device.

In FIGS. 1 and 2 reference numeral 1 shows a throughflow hopper having two discharge orifices 2 and 3. The hopper is provided with three points of support 4, 5 and 10, in the positions indicated about the periphery of the hopper. The supports 4 and 5 are supported by the supports 6 and 7 of the stationary surrounding supporting structure through two load measuring devices 8 and 9 adapted to give electric signals which are proportional to the load which is transmitted by said measuring devices. Such load measuring devices are generally known and thus need not be described in detail. The third support 10 is embodied as a universal pivoting support, e.g. as a ball pivot.

The hopper is filled from above by a conveyor belt 11 with material which is conveyed from a wheel digging machine not shown by an intermediary conveyor belt 12. The material flowing from the discharge orifices 2 and 3 is fed by a conveyor belt system 13, 14 to a dumping machine (not shown), which strews out this material into a mixing heap. Such wheel digging machines and dumping machines are generally known and usual in the art and thus they need not be described in detail here. Between the discharge orifices 2 and 3 of the hopper and the belt 13 two metering apparatuses 15 and 16 are positioned embodied as pulsating troughs. Said pulsating troughs are driven by the electric motors 17 and 19 energized through energy control devices 18 and 20 respectively.

The weight of the ore quantity discharged by the belt 13 is continuously measured by a belt weighing device 21 pushed into contact with this belt 13 at the lower surface of its operative run. Such belt weighing devices are generally known and need not be described in detail. They give an electric signal which is proportional to the weight of the passing load.

In FIG. 3 the control system necessary for exerting the several functions of the device has been shown diagrammatically. The electric measuring signals of the load measuring devices 8 and 9 are supplied through leads or conductors 29, 30, 31 and 32 to the control device 22 and to the adding device 26 respectively. The control device 22 gives a signal 34 which serves to influence the distribution of the material in the hopper finally in such a way that the entering signals 29 and 30 become equal. To this effect the signal 34 is supplied to the control device 23, which gives two signals, 35 and 36, one to each energy supply control device 18 and 20 for the motors 17 and 19.

Also into the control device 23 a signal 38 is fed, which is derived from a quantity control device 24. This control device 24 controls towards a constant weight on belt 13 through the signal 37, derived from belt weighing device 21. Therewith this constant weight may be adjusted by means of an adjusting knob 25 through the adjusting signal 39 to any desired load on the belt. The output signal 38 will control the sum of the signals 35 and 36.

In adding unit 26 the signals 31 and 32 of the load measuring devices are added and are fed as an added signal 33 to the cabin of the operator of the wheel digging machine. In said cabin the signal 33 is translated into an indication on the level indicator 27. As in fact the signals given by the load measuring devices 8 and 9 are representative for the weight of the filling in the hopper and not for the height of filling thereof, there is a correction knob 28 for making a correction in the indication of that level indicator 27 for the measured specific bulk weight of the ore mass in the hopper.

In FIG. 3 a situation has been drawn in which this correction is made by hand, and in which the operator of the wheel digging machine on the basis of the visual indication of the level indicator 27 controls the speed of digging by hand. Of course refinements are possible in which a measuring of the specific bulk weight makes a correction in the level indicator 27 continuously or intermittently in an automatic manner, and/or in which the apparatus 27 is used to cause an automatic correction of the speed of digging.

The corrected signal of apparatus 27 is moreover used for making the following operations when the filling in the hopper passes the critical levels 40, 41, 42 and 43. If the amount of filling of the hopper is so low that the level of the ore drops to reach the level 43, the metering apparatus 15 and 16 are stopped by signal "stop discharge" in order to protect them against idling and against the action of the ore falling from a considerable height onto them with empty hopper.

Only if the level in the hopper rises to reach the level 42, "discharge on", the metering apparatus are started. Thus it is avoided that the metering apparatus after having been started will have to be stopped immediately again by having the level in the hopper decrease again to level 43, "stop discharge".

If for some reason the metering apparatus will stop by some disturbance or damage, or for some other reason, the wheel digging machine 44 will automatically be stopped. Therewith it is obtained that a considerable part of the ore which is still present on the conveyor belts between the digging machine and the hopper, can still be taken up by the hopper.

If the level in the hopper passes the level 41 upwardly, which is the level "supply stop", the wheel digging machine 44 is automatically stopped. During a time period of e.g. about 8 minutes the difference between the supplied ore and the discharged ore can be taken up in the hopper. If the level in the hopper goes down so as to pass level 41 again ("supply on"), the wheel digging machine will begin to operate again.

If e.g. one of the components of the system will not operate correctly and thereby the level 40 "over maximum" is surpassed, a separate detector to stop the supply belts 11 and 12 is operated.

The conveyor belt weighing device 46, which is mounted at a short distance before the dumping machine 45, is coupled to the drive of this dumping machine 45. Only if this weighing device 46 measures at least a certain minimum by weight, a command is given which makes the dumping machine move. In a typical embodiment of the device described the hopper 1 has a volume of 140 m$^3$ and the metering apparatuses together have a capacity of 2,000 tons per hour.

What we claim is:

1. A method for forming a mixing heap of bulk material consisting of a large number of horizontal layers of material, one on top of the other, comprising digging and feeding the bulk material from a material source to a hopper zone, maintaining a weight control of said hopper, discharging the bulk material from said hopper zone to a conveying zone, maintaining a weight control of the material discharged from said hopper zone to said conveying zone, passing the material in a constant flow from the conveying zone to the material heap being formed to form a horizontal layer thereon, and correlating the control of the weight of the feed of the material to said hopper zone, the control of the weight of the feed of the material from the hopper zone, and the control of the weight from the zone to the heap such that the speed at which the material is dug is dependent upon the filling of the hopper zone.

2. A device for forming homogeneously built-up mixing heaps of bulk material consisting of a plurality of horizontal layers of different materials comprising a digging machine for digging the material from a supply source, longitudinally movable flow-through hopper means, conveyor means for carrying said material from said digging machine to said hopper means, metering means associated with the discharge end of said hopper means, discharge conveyor means operatively associated with said metering means to receive the material from said hopper means and to discharge same to a heap to form a horizontal layer of bulk material thereon, and means to detect the degree of filling of the hopper means and to thereby control the speed of the digging machine.

3. A device in accordance with claim 2, characterized in that said hopper means is provided with two discharge orifices, each of said orifices being provided with metering means for discharging material to a single discharge conveyor means, and further characterized in that said hopper means is supported by three support means, one of said support means being centrally positioned to permit pivotal movement and the other of said support means includes load measuring means therewith and a control device for controlling the relation of the discharge speed of said metering means, said load measuring means including means to transmit electrical signals indicating load measurement on each of said support means to said control device to actuate same.

4. A device in accordance with claim 2, characterized in that said discharge conveyor means is provided with conveyor belt weighing means, and adjustable quantity control means operatively connected on one side to said belt weighing means and on the other side to said metering means whereby the total quantity of material metered per unit time may be controlled so as to be maintained at an adjustable level.

5. A device in accordance with claim 2, characterized in that the metering means are mechanically driven pulsating troughs.

6. A device in accordance with claim 2, characterized in that the means for controlling the speed of the digging machine will also stop the conveyor means for the supply to and discharge from said throughflow hopper means if the material in said hopper means is higher than a critical level or is lower than a critical level respectively.

* * * * *

UNITED STATES PATENT OFFICE
CERTIFICATE OF CORRECTION

PATENT NO. : 3,782,528
DATED : Jan. 1, 1974
INVENTOR(S) : Jacobus J. Burger et al It is certified that error appears in the above-identified patent and that said Letters Patent are hereby corrected as shown below:

In the Caption, item 30, for "September 10, 1970" read -- September 14, 1970 --

Signed and sealed this 17th day of June 1975.

(SEAL)
Attest:

RUTH C. MASON
Attesting Officer

C. MARSHALL DANN
Commissioner of Patents
and Trademarks